United States Patent Office

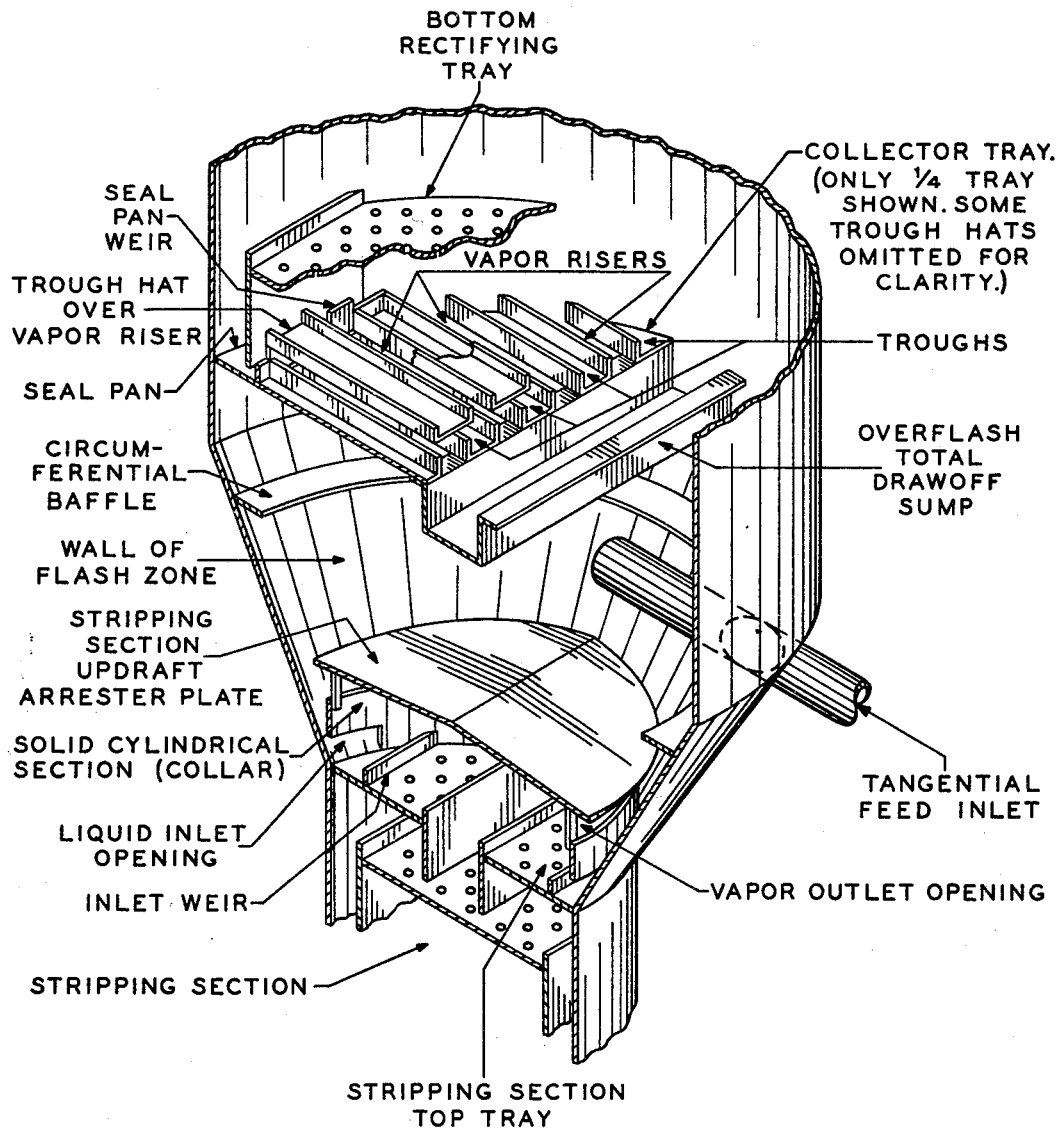

3,501,400
Patented Mar. 17, 1970

3,501,400
DEENTRAINMENT DISTILLATION OF HYDROCARBONS IN STRIPPING COLUMN HAVING ARRESTER PLATE AND COLLAR
Gerald L. Brody, Kensington, Calif., assignor to Chevron Research Company, San Francisco, Calif., a corporation of Delaware
Filed Feb. 8, 1968, Ser. No. 703,964
Int. Cl. B01d 3/06, 3/18
U.S. Cl. 208—361     8 Claims

ABSTRACT OF THE DISCLOSURE

To reduce entrainment of residuum into distillate products an arrester plate is installed above the top tray of the stripping section of a vacuum or atmospheric crude oil distillation column. The arrested plate arrests direct upward vapor draft from the top stripping tray. A cylindrical collar beneath the arrester plate has lower openings to allow residuum liquid from the flash zone to enter the liquid inlet area of the top tray of the stripping section and upper openings to allow arrested vapor from the stripping section top tray to escape from beneath the arrester plate.

BACKGROUND OF THE INVENTION

Field of the invention

This invention relates to apparatus and methods for use in distillation column flash zones to reduce entrainment of residuum into distillate.

The prior art

In the vacuum distillation of reduced crudes gas oil is distilled from a heavy bottoms product. The gas oil is usually a clean light-colored product unless it is contaminated with bottoms. The bottoms product is not volatile enough to be present in the first drawoff stream above the flash zone (gas oil stream) according to equilibrium vaporization, but bottoms may be carried into the gas oil stream because of entrainment.

The gas oil product may be feed for a number of various subsequent processing steps in the refinery. For example, it may be used as feed to a hydroconversion process such as hydrotreating and/or hydrocracking. In most hydroconversion processes fixed beds of catalyst are used. If there are metals contained in the feed to the hydroconversion processes, such as soluble organometallic compounds, the bed will generally become increasingly plugged with metals as they deposit on the catalyst. Much of these metals deposit in the interstitial space between the catalyst particles causing the pressure drop to increase. Whether a fixed bed or a fluidized bed is used in the hydroconversion process, the depositing metals in any case decrease the activity of the catalyst. The gas oil product from the vacuum distillation column may also be feed for a catalytic cracking unit. Generally, it is even more important that a good feedstock for a catalytic cracking unit contain a minimum amount of metals, especially nickel and vanadium, which adversely affect both catalyst selectivity and life.

The metals enter the gas oil by two routes: (1) by vaporization, since the organometallic compounds do have a finite vapor pressure, although their vapor pressure is extremely low and by far the greatest amount of the metallic compounds are in the very heaviest fraction of the residuum, and (2) by entrained liquid with the gas oil vapors. The elimination of entrainment can, of course, only eliminate the metals present in the gas oil via the second route; however, because of the low volatility of the metal compounds, if the entrainment can be significantly reduced a very important improvement is made in the feed for the hydroconversion unit, catalytic cracking unit, etc.

Typically the asphalt product from the vacuum distillation column contains metals in a concentration approximately 100 to 300 times that usually found in good gas oils. To prevent these metal compounds from being entrained into the gas oil in accordance with the prior art demister pads, consisting basically of wire mesh, have been located between the flash zone and the gas oil drawoff. For example, a typical construction consists of a flash zone to which hydrocarbon feed is fed via a tangential entry at sufficiently high temperature so that under the low pressure in the flash zone vaporization of hydrocarbons normally boiling below a design cut point, typically about 900° F., will result. The 900° F. and lighter hydrocarbons pass upward from the flash zone and are drawn off at various points above the flash zone as products. The first liquid drawoff product above the flash zone is generally called gas oil. This gas oil product frequently is too high in metals content to be good feed for subsequent processing, especially when cutting deep into the feed, for example 900° F. to 1000° F. or even 1050° F. normal boiling point cut point between residuum and distillate (gas oil).

From two to six trays may be installed in the column above the flash zone before the gas oil drawoff. To reduce entrainment of residuum from the flash zone up to the gas oil drawoff, as previously mentioned, a demister pad is frequently installed at some point between the flash zone and the gas oil drawoff. However, the demister or wire mesh pad has not been found completely satisfactory for a number of reasons: (1) entrainment in many cases is not found to be significantly reduced; (2) the wire mesh pads have a tendency to plug up with heavy oil and other material; (3) a wire mesh pad has a tendency to corrode with holes resulting from the corrosion. Methods other than demister pads have been tried in the past to reduce the entrainment of residuum into the gas oil, but these methods have met with only limited success.

SUMMARY OF THE INVENTION

According to the present invention, in a process for the distillation of hydrocarbons, wherein the hydrocarbons are fed to a distillation column flash zone, said flash zone located between a bottom tray of a rectifying section and a top tray of a stripping section, and distillate flashes as vapor to be withdrawn as distillate above the flash zone and residuum remains as liquid to be withdrawn as residuum below the flash zone, and wherein the hydrocarbons are fed to the distillation column at approximately tangential entry, the improvement is made which comprises:

(a) Arresting upward flowing vapors and entrained liquid from the stripping section before the upward flowing vapors enter the flash zone by providing an arrester plate between the stripping section and the flash zone to block upward flowing entrained liquid from the stripping section and to reduce direct updraft in the flash zone which entrains residuum hydrocarbons fed to the flash zone, (b) Allowing upward flowing vapors from the stripping section to flow out from underneath the arrester plate, approximately perpendicular to the normal upward flow direction of vapors in the distillation column;

(c) Allowing residuum liquid from the flash zone to flow from the flash zone and enter the top stripping tray only through a collar with one or more side inlet openings to the top stripping tray; and (d) Directing the upward flowing vapors from the stripping section approximately horizontally into the downward flowing liquid from the flash zone by providing a collar beneath the arrester plate and above the top stripping tray, said collar having a first opening approximately immediately beneath the arrester plate to allow flow of vapors from the stripping section, and a second opening approximately immediately above the top stripping tray to allow liquid from the flash zone to flow onto the top stripping tray.

Although the present invented process and apparatus is most advantageously used in a vacuum distillation column, it also has application in an atmospheric crude oil distillation column, as in the crude oil distillation column it is also important to minimize entrainment of reduced crude into the gas oil product withdrawn immediately above the flash zone. Thus the apparatus of the present invention has general application for reducing entrainment of either crude residuum or vacuum residuum into distillate products.

According to the present invention, the apparatus for reducing entrainment of residuum into distillate products comprises, in combination with a distillation column having a flash zone into which hydrocarbons are fed via an approximately tangential entry and are flashed with resulting vapors flowing upward to a rectifying section of the distillation column and resulting liquid flowing downward to a stripping section of the distillation column:

(a) Arrester means for preventing direct upward flow of vapor from the stripping section into the flash zone, and (b) Means for directing the upward flowing vapors from the stripping section top tray approximately horizontally into the downward flowing liquid from the flash zone.

Preferably the arrester means used in this apparatus is comprised of an arrester plate having approximately the same diameter as the top tray of the stripping section, said arrester plate being located directly above the top tray and approximately parallel to the top tray. The arrester plate may be formed with slight inclinations in the shape of a roof so that any liquid that may drop down upon the top of the plate will run off to the side of the plate.

Shaping the arrester plate like a roof also will give the vapor flowing out from underneath the arrester plate an angle slightly downward from horizontal. This is advantageous because typically the walls of the distillation column at the flash zone are swedged inward so as to reduce the diameter of the column for the stripping section. Thus the liquid flowing down the walls will be angled inward and the vapor flowing out from underneath the arrester plate will flow more directly, that is more nearly perpendicularly, into the downward flowing liquid. This direct flow of vapor into the downward swirling liquid has been found to be an important feature in reducing entrainment.

The greatly reduced entrainment obtained when employing the process and apparatus of the present invention is believed to be due primarily to three factors:

(1) The arrester plate substantially eliminates the direct updraft from the stripping section through the flash zone of the distillation column, (2) Entrained residuum from the stripping section is separated from the upward flowing vapor from the stripping section when the entrained residuum particles hit the arrester plate and fall downward into the liquid on the top stripping section tray, and (3) Entrained residuum that continues to remain in the vapor from the stripping section after impingement on the arrester plate is disengaged from the vapor when the vapor flows sideways out from underneath the arrester plate and momentum components of the swirling vapor in the flash zone as well as horizontal momentum components of the vapor flowing out from underneath the arrester plate direct the entrained residuum into the downward swirling liquid along the walls of the flash zone.

In the apparatus of the present invention it is also preferable that the means for directing the upward flowing vapors from the stripping section top tray approximately horizontally into the downward flowing liquid from the flash zone is comprised of a circumferential collar which is approximately the same diameter as the top tray of the stripping section, said collar being located between the arrester plate and the top tray, and said collar having an opening immediately below the arrester plate to allow vapors from the stripping section to flow out from beneath the arrester plate, and an opening immediately above the top tray of the stripping section to allow liquid flow from the flash zone onto the top tray.

BRIEF DECRIPTION OF THE DRAWING

The drawing schematically illustrates the method and apparatus for reducing entrainment in a distillation column.

DETAILED DECRIPTION OF THE DRAWING

Referring now in detail to the drawing, hydrocarbon feed at elevated temperature and reduced pressure enters the flash zone of a vacuum distillation column via the tangential feed inlet. Typically the pressure in the flash zone is about 25 to 50 mm. Hg and the temperature is generally between 700 and 800° F. The particular design conditions depend upon what distillate products are desired to be obtained from the feed and also upon practical operating limitations. For example, a gas oil product boiling between about 600 and 850° F. may be withdrawn as the first product above the flash zone. To obtain this gas oil product, vaporization of hydrocarbons in the feed boiling up to at least 850° F. must be obtained. Typically further vaporization is obtained to provide for reflux on the trays between the flash zone and the gas oil drawoff (wash oil section).

The effective hydrocarbon partial pressure in the flash zone is reduced by steam present in the flash zone. The steam is introduced in the lower part of the stripping section and travels upward stripping light hydrocarbons out of residuum flowing downward in the stripping section of the column. The stripping section steam along with vaporized hydrocarbons ordinarily passes directly upward from the stripping section top tray, through the flash zone, and into the section of the column above the flash zone and below the gas oil drawoff. In the present invention the large quantities of steam from the stripping section top tray along with the generally relatively small amount of hydrocarbons stripped from the residuum is not allowed to pass directly upward from the stripping section top tray but instead is arrested by the stripping section updraft arrester. The vapor is allowed to escape from underneath the arrester through vapor outlet openings along the periphery of the arrester. As shown in the drawing, the vapor outlet opening extends around the full periphery of the outer edge of the stripping section arrester plate. Thus the arrester plate substantially eliminates the direct updraft from the stripping section which in columns designed according to the prior art would pass directly upward from the top tray of the stripping section, through the flash zone, and into the zone above the flash zone and below the gas oil drawoff.

A solid cylindrical section or collar is located immediately beneath the arrester plate. This collar serves to aim the stripping section vapor directly into the residuum which travels downward along the walls of the flash zone. The residuum enters the top stripping section tray via liquid inlet openings cut in the lower part of the cylindrical collar.

In brief summary, the operation of the flash zone is as follows: Hydrocarbon feed enters tangentially and flashes in the flash zone with distillate hydrocarbon vapors traveling upward in the flash zone and residuum whirling circumferentially around the wall of the flash zone and gradually downward toward the top tray of the stripping section. As the residuum reaches the level of the stripping section top tray it enters the top tray by passing through the liquid inlet opening and on to the inlet area of he first tray and then over the inlet weir. The residuum passes over the top tray and then down to the next lower tray in the stripping section and then down through however many more stripping trays are used in the stripping section. At the bottom of the stripping section steam is injected which passes upward through the stripping section to strip small amounts of light hydrocarbons (that is, distillate boiling range hydrocarbons) out of the residuum. The stripping steam and light hydrocarbons rise upward from the top tray of the stripping section and impinge against the arrester plate. Then the steam and light hydrocarbons escape sideways from underneath the arrester plate through the vapor outlet opening. The steam and light hydrocarbons then travel upward through the flash zone to join the vaporized portion of the hydrocarbon feed to the distillation column. Above the flash zone the distillation column is operated the same as a standard vacuum distillation column or crude oil distillation column—that is, various oil cuts are withdrawn at different points on up the column with steam and very light hydrocarbons such as methane, ethane, etc., leaving the very top of the column. The first cut above the flash zone is a gas oil cut, which is frequently called a heavy gas oil cut in the case of a vacuum column, generally boiling up to about 900° F., and in the case of a crude column is a less heavy gas oil product, generally boiling up to about 600° F.

Preferred design criteria for the deentrainment device include the following:

(1) The diameter of the cylindrical collar is the same as that of the stripping section.

(2) The total height of the arrester plate above the top stripping tray should be no less than one tray spacing or 2 feet. The maximum height is set by a preferred minimum clearance of about 6 inches between the top of the device and the bottom of the tangential feed inlet line.

(3) The area of the peripheral vapor outlet opening is 0.5 to 2 times the cross sectional area of the cylindrical collar. Presure drop and existing height limitations dictate the exact value. Generally the pressure drop should be between 0.1 to 1.0 inch of hot liquid.

(4) The arrester plate is preferably slightly pitched similar to a roof to allow runoff of liquid.

(5) The liquid inlet opening is sized to be large enough to have a small pressure drop, generally between 0 to 2.0 inches of hot liquid, and small enough to prevent vapor bypassing through this slot. The dimensions, therefore, must be determined on the basis of flow rates in an individual column.

Example

In this example, a vacuum distillation column without the deentrainment apparatus of the present invention is compared to a vacuum distillation column with the deentrainment apparatus. The calculations are made based on pilot plant data.

Flash zone conditions for the vacuum distillation column of this example are as follows:

(1) Approximately 900° F. TBP cut point on the hydrocarbon feed to the distillation column.

(2) No vaporization of organo-metallic compounds contained in the hydrocarbon feed.

(3) 95% of flooding in the stripping section.

(4) Approximately 50% vaporization of the hydrocarbon feed.

Conditions in the wash oil section for the vacuum distillation column of this example are as follows:

(1) Three sieve trays with 8% hole area.

(2) Reflux rate approximately 20 gals./hour/inch of weir.

(3) Vapor-liquid loading at approximately 80% of flooding.

(4) 30% of total distillate taken as the first side cut, that is, the lowest gas oil drawoff.

The organo-metallic compounds contained in the feed total approximately 100 parts per million as metals; and the residuum approximately 200 parts per million organo-metallic compounds as metals.

On the basis of 100,000 lbs./hr. hydrocarbon feed, the vapor rate in the flash zone at 10% over flash is 55,000 lbs./hr. The entrainment rate (calculated based on pilot plant data) is .026 lb. residuum per lb. of vapor. Thus, a total of 1,430 lbs./hr.

$$(.026 \times 55,000 = 1430)$$

of residuum is entrained. Organo-metallic compounds entrained therefore is .286 lb./hr. as metals $$(1430 \times 200 \times 10^{-6} = .286 \text{ lb./hr.}).$$

Using three trays in the wash oil section, it has been found that the entrainment is attenuated or reduced by a factor of .125. Thus for a first side cut gas oil drawoff of 15,000 lbs./hr. the metals content is 2.35 parts per million.

$$\left[ \frac{.125 \times .286 \times 10^{-6}}{15,000} = 2.35 \text{ p.p.m.} \right]$$

Using the process and apparatus of this invention, that is, with the deentrainment device in the distillation column, the metals contained in the first side gas cut oil drawoff is less than .5 part per million for the conditions given above.

Referring again to the drawing, a circumferential baffle is shown on the wall of the flash zone above the feed inlet. This baffle serves to prevent liquid from creeping up the wall of the flash zone. Also, as part of the environment of the present invention, the drawing illustrates part of the column immediately above the flash zone, such as the seal pan for the bottom rectifying tray and the seal pan weir, the collector tray with vapor risers and troughs (to direct liquid to the overflash total drawoff sump), and trough hats over the vapor risers (to catch any liquid weeping from the bottom rectifying tray and direct liquid to the overflash sump).

Although various specific embodiments of the invention have been described and shown, it is to be understood that they are meant to be illustrative only and not limiting. Certain features may be changed without departing from the spirit or essence of the invention. It is apparent that the invention has broad application to deentrainment in the feed or flash zone of a distillation column. Accordingly, the invention is not to be construed as limited to the specific embodiments illustrated but only as defined in the following claims.

I claim:

1. Apparatus for reducing entrainment of residuum into distillate products, which comprises, in combination with a distillation column having a flash zone into which hydrocarbons are fed via an approximately tangential entry and are flashed with resulting vapors flowing upward to a rectifying section of the distillation column and resulting liquid flowing downward to a stripping section of the distillation column, (a) arrester means for preventing direct upward flow of vapor from the stripping section into the flash zone, said arrester means being located beneath the tangential entry and above the stripping section top tray; and (b) means comprising a collar beneath the arrester means for directing the upward flowing vapors from the stripping section top tray approximately horizontally into the downward flowing liquid from the flash zone.

2. Apparatus as in claim 1 wherein the distillation column is a vacuum distillation column.

3. Apparatus as in claim 1 wherein the arrester means comprises an arrester plate having approximately the same diameter as the top tray of the stripping section, said arrester plate being located below the tangential entry and directly above the top tray and approximately parallel to the top tray.

4. Apparatus as in claim 3 wherein the distillation column is a vacuum distillation column.

5. Apparatus as in claim 3 wherein the means for directing the upward flowing vapors from the stripping section top tray comprising a circumferential collar which is approximately the same diameter as the top tray of the stripping section, said collar being located between the arrester plate and the top tray, and said collar having an opening immediately below the arrester plate to allow vapors from the stripping section to flow out from beneath the arrester plate, and an opening immediately above the top tray of the stripping section to allow liquid flow from the flash zone onto the top tray.

6. Apparatus as in claim 5 wherein the distillation column is a vacuum distillation column.

7. In a process for the distillation of hydrocarbons wherein the hydrocarbons are fed to a distillation column flash zone, said flash zone located between a bottom tray of a rectifying section and a top tray of a stripping section, and distillate flashes as vapor to be withdrawn as distillate above the flash zone, and residuum remains as a liquid to be withdrawn as residuum below the flash zone, and wherein the hydrocarbons are fed to the distillation column at approximately tangential entry, the improvement which comprises:
(a) arresting upward flowing vapors and entrained liquid from the stripping section before the upward flowing vapors enter the flash zone by providing an arrester plate between the top tray of the stripping section and the tangential entry to the flash zone to block upward flowing entrained liquid from the stripping section and to reduce direct updraft in the flash zone which entrains residuum hydrocarbons fed to the flash zone;
(b) allowing upward flowing vapors from the stripping section to flow out from underneath the arrester plate approximately perpendicular to the normal upward flow direction of vapors in the distillation column;
(c) allowing residuum liquid from the flash zone to flow from the flash zone and enter the top stripping tray only through a collar with one or more side inlet areas to the top stripping tray; and
(d) directing the upward flowing vapors from the stripping section approximately horizontally into the downward flowing liquid from the flash zone by providing a collar beneath the arrester plate and above the top stripping tray, said collar having a first opening approximately immediately beneath the arrester plate to allow flow of vapors from the stripping section and a second opening approximately immediately above the top stripping tray to allow liquid from the flash zone to flow onto the top stripping tray.

8. Process as in claim 7 wherein the distillation column is a vacuum distillation column.

References Cited

UNITED STATES PATENTS

| | | | |
|---|---|---|---|
| 1,962,153 | 6/1934 | Peterkin | 202—200 X |
| 2,217,356 | 10/1940 | Becknell | 261—114 X |
| 2,217,386 | 10/1940 | Schulze | 196—114 |
| 2,726,198 | 12/1955 | Lowman et al. | 208—361 |
| 3,075,578 | 1/1963 | Sumiya | 203—40 X |
| 3,080,300 | 3/1963 | Smith | 196—114 |
| 3,093,468 | 6/1963 | Krochta | 55—238 |
| 3,217,469 | 11/1965 | Eckert | 55—204 |
| 3,328,264 | 6/1967 | Wartenberg | 203—11 X |

FOREIGN PATENTS 500,796    3/1954    Canada.

NORMAN YUDKOFF, Primary Examiner

F. E. DRUMMOND, Assistant Examiner

U.S. Cl. X.R.

196—114; 202—197; 203—40, 88; 208—364, 367.